United States Patent Office 3,642,939
Patented Feb. 15, 1972

3,642,939
RADIATION-CURABLE VINYL PAINT CONTAINING PENDANT UNSATURATION WITH INTERVENING ETHER FUNCTIONALITY
John F. Fellers and James E. Hinsch, Livonia, and Ernest O. McLaughlin, Garden City, Mich., assignors to Ford Motor Company, Dearborn, Mich.
No Drawing. Filed Nov. 4, 1968, Ser. No. 773,346
Int. Cl. C08g 45/04
U.S. Cl. 260—836
15 Claims

ABSTRACT OF THE DISCLOSURE

A film-forming, radiation-polymerizable, paint binder solution of vinyl momomers and an olefinically unsaturated vinyl monomer-comprising polymeric binder is applied as a liquid coating to an external surface of an article of manufacture and cured thereon with ionizing radiation. The binder polymer is characterized by having olefinic unsaturation between the terminal carbons of the side chains, i.e. alpha-beta unsaturation, with said unsaturation being separated from the principal carbon-to-carbon chain by two ether linkages. The binder polymer is formed by reacting an allylic alcohol with a polymer formed by reacting an unsaturated glycidyl ether with at least two different vinyl monomers at least one of which is an ester of acrylic or methacrylic acid.

---

This invention relates to the art of coating and is concerned with paint and articles of manufacture, particularly articles having external surfaces of wood, metal or polymeric solid coated with an adherent coating of a film-forming, radiation-polymerizable, paint binder solution of vinyl monomers and an alpha-beta olefinically unsaturated vinyl monomer-comprising binder polymer having alpha-beta olefinically unsaturated side chains characterized in that such unsaturation is separated from the principal carbon-to-carbon chain by two ether linkages, i.e.

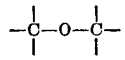

Heretofore, side chain unsaturation in radiation-polymerizable paints has been separated from the principal carbon-to-carbon chain of the binder polymer by one or more ester linkages. Films cast by these polymers are more resistant to hydrolysis than films cast from polymers having ester linkages and hence the paints of this invention provide superior corrosion protection and weatherability.

In this application, the term "paint" is meant to include pigment and/or finely ground filler in the binder solution, the binder solution without pigment and/or filler or having very little of the same, which can be tinted if desired, and other surface coating compositions containing the binder solution which might be considered to be broadly analogous to enamel, varnish, or lacquer bases. Thus, the binder solution, which is ultimately converted to a durable film resistant to weathering, can be all or virtually all that is used to form the film, or it can be a vehicle for pigment and/or particulate filler material.

The term "ionizing radiation" as employed herein means radiation having sufficient energy to effect polymerization of the paint films herein disclosed, i.e., energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 volts per inch of distance between the radiation emitter and the workpiece where the intervening space is occupied by air. Adjustment can be made for the relative resistance of the intervening gas which is preferably an oxygen-free inert gas such as nitrogen or helium. We prefer to employ an electron beam which at its source has average energy in the range of about 150,000 to about 450,000 electron volts.

The films formed from the preferred embodiments of the paints of this invention are advantageously cured at relatively low temperatures, e.g. between room temperature (20° to 25° C.) and the temperature at which significant vaporization of its most volatile components is initiated, ordinarily between 20° and 70° C. The radiation energy is applied at dose rates of about 0.1 to about 100 mrad per second upon a preferably moving workpiece with the coating receiving a total dose in the range of about 0.5 to about 100, ordinarily between about 1 and about 25, and most commonly between about 5 and about 15 mrad.

The polmeric paint binders of this invention have an average molecular weight above about 500, advantageously between about 1,000 and about 50,000, and preferably about 4,000 to about 20,000. They contain about 0.5 to about 5, advantageously about 0.5 to about 3.5, and preferably about 1 to about 3, units of alpha-beta olefinic unsaturation per 1,000 units molecular weight. The term "alpha-beta olefinic unsaturation" as used herein means olefinic unsaturation between the two terminal carbons of polymer side chains.

The vinyl monomer-comprising copolymer which is subsequently reacted with an allylic alcohol to form the binder polymer is itself formed by reacting an unsaturated glycidyl ether with two or more different vinyl monomers.

The term "vinyl monomer" as used herein refers to a monomeric compound having a

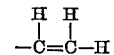

or

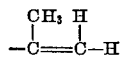

terminal group and excludes allylic compounds. The preferred vinyl monomers are esters of $C_1$–$C_8$ monohydric alcohols and acrylic or methacrylic acid, e.g. methyl methacrylate, ethyl acrylate, butyl acrylate, butyl methacrylate, octyl acrylate, 2-ethyl hexyl acrylate, etc. Alcohols of higher carbon number, e.g. $C_9$–$C_{15}$ can also be used to prepare such esters. To simplify description the esters of acrylic acid and methacrylic acid are hereinafter termed "acrylates." Vinyl hydrocarbon monomers, e.g. styrene and alkylated styrenes such as vinyl toluene, alpha-methyl styrene, etc., may be used separately or in combination with the aforementioned acrylates. In combination with the acrylate monomers and/or vinyl hydrocarbon monomers, there may be used minor amounts of other vinyl monomers such as nitriles, e.g. acrylonitrile, acrylamide, or N-methylol acrylonitrile, vinyl halides, e.g. vinyl chloride, and vinyl carboxylates, e.g. vinyl acetate. The paint binder solutions contain about 15 to about 75, preferably about 20 to about 60, weight percent, vinyl monomers. In a preferred embodiment, the vinyl monomers and the binder polymer of this invention together comprise at least about 85 weight percent of said binder. Minor amounts of other polymerizable monomers, e.g. allylic compounds, may be used to make up the balance, if any.

This invention is particularly concerned with those coatings wherein the film-forming solution consists essentially of vinyl monomers and the binder resin of this invention, herein defined to mean coatings wherein the sum of these two components constitute at least about 85 weight percent of the film-forming binder.

The allylic alcohol used to impart the alpha-beta olefinic unsaturation to the binder polymer is ordinarily a $C_3$ to $C_{10}$ allylic alcohol, e.g. allyl alcohol, 2-methyl-2-propen-1-ol, cinnamyl alcohol (3-phenyl-2-propen-1-ol), 2-phenyl-2-propen-1-ol, etc. The aforementioned alcohols may have alkyl substitution with resultant increase in the number of carbon atoms per molecule to as high as about 14.

The unsaturated glycidyl ethers used in the preparation of the aforesaid copolymer are ordinarily a $C_6$ to $C_{13}$ glycidyl ethers but will contain 17 carbon atoms where the ether is formed from a $C_{14}$ alcohol and epichlorohydrin and include such compounds as allyl glycidyl ether, 1-butene glycidyl ether and glycidyl ethers formed from the aforementioned allylic alcohols. Such ethers can be prepared by the well known reaction of such alcohols and epichlorohydrin or by the Williamson Synthesis.

The paint film may be applied by any conventional technique such as spraying, roll coating, dip coating, flow coating, etc. The film is conventionally applied to an average depth in the range of about 0.1 to about 4 mils.

The invention will be more fully understood from the following illustrative examples:

EXAMPLE 1

A vinyl monomer-comprising polymer is prepared from the following reactants:

| | Parts by weight |
|---|---|
| Ethyl acrylate | 38.8 |
| Methyl methacrylate | 23.2 |
| Allyl glycidyl ether | 37.0 |
| Benzoyl peroxide | 1.0 |
| Xylene (solvent). | |

To a reaction vessel provided with a condenser, thermometer, agitator, and dropping funnel there are charged an amount of xylene equal in weight to the reactants to be added in the first reaction step. The xylene is heated to about 100°–120° C. The four reactants are thoroughly mixed and added slowly with a dropping funnel to the heated xylene over a period of four hours. The reaction is held at this temperature for 1–2 hours after addition is complete and then allowed to cool to room temperature.

A binder polymer is formed in a second reaction step from the following materials:

| | Parts by weight |
|---|---|
| Copolymer from Step I | 69.4 |
| Allyl alcohol | 30.4 |
| Potassium hydroxide | 0.2 |

A solution of the allyl alcohol and potassium hydroxide is added to the copolymer at room temperature. The mixture is then heated to a temperature of 100°–120° C. This temperature is maintained for about 7 hours and allowed to cool. The binder polymer reaction mixture is heated to about 60° C. and the xylene and excess reactant are removed by vacuum distillation.

At a temperature of about 60° C. styrene and hydroquinone are added to the polymer to form a film-forming solution having the following composition:

| | Parts by weight |
|---|---|
| Polymer from Step II | 66.66 |
| Styrene | 33.27 |
| Hydroquinone | 0.07 |

The film-forming solution is applied to a metal substrate to an average depth of about 0.3 mil and cured thereon by electron beam irradiation. The conditions of irradiation are as follows:

Voltage: 270 kv.
Current: 25 milliamperes
Total dosage: 15 mrads
Atmosphere: Nitrogen

EXAMPLE 2

The procedure of Example 1 is repeated with the single difference that an equivalent amount of methyl methacrylate is substituted for the styrene monomers in the film-forming solution.

EXAMPLE 3

The procedure of Example 1 is repeated with the single difference that an equivalent amount of a mixture of styrene, ethyl acrylate and 2-ethyl hexyl acrylate is substituted for the styrene monomers in the film-forming solution.

EXAMPLE 4

The procedure of Example 1 is repeated except that an equimolar mixture of methyl methacrylate and vinyl toluene is substituted for the styrene monomers in the film-forming solution, the substrate is wood, and the film depth is about 1 mil.

EXAMPLE 5

The procedure of Example 1 is repeated except that the film-forming solution contains about 30 wt. percent of the polymeric binder and about 70 wt. percent of a mixture of styrene and butyl methacrylate.

EXAMPLE 6

The procedure of Example 1 is repeated except that the film-forming solution contains about 70 wt. percent of the polymeric binder and about 30 wt. percent of a mixture of alpha-methyl styrene, ethyl acrylate, and butyl acrylate.

EXAMPLE 7

The procedure of Example 1 is repeated with the following changes:

(a) The reactants of the first step reaction are:

| | Parts by weight |
|---|---|
| Butyl acrylate | 38.8 |
| Styrene | 23.2 |
| Allyl glycidyl ether | 37.0 |
| Benzoyl peroxide | 1.0 |

(b) The reactants of the second step reaction are:

| | Parts by weight |
|---|---|
| Copolymer from (a) | 69.4 |
| 1-penten-5-ol | 30.4 |
| Potassium hydroxide | 0.2 |

(c) Composition of film-forming solution:

| | Parts by weight |
|---|---|
| Polymer from (b) | 66.6 |
| Methylmethacrylate | 33.27 |
| Hydroquinone | 0.07 |

EXAMPLE 8

The procedure of Example 7 is repeated except that an equivalent amount of 1-butene glycidyl ether is substituted for the allyl glycidyl ether component of the first step reaction, 3-phenyl-2-propen-1-ol is substituted for the 1-penten-5-ol of the second step reaction, and the vinyl monomers of the binder solution are an equimolar mixture of styrene and methyl methacrylate.

EXAMPLE 9

The procedure of Example 7 is repeated except that an equivalent amount of cinnamyl glycidyl ether is substituted for the allyl glycidyl ether component of the first step reaction, 9-decen-1-ol is substituted for the 1-penten-5-ol of the second reaction step and the vinyl monomers of the binder solution are equimolar mixture of styrene and methyl methacrylate.

EXAMPLE 10

The procedure of Example 7 is repeated with the differences that the constituent monomers of the first step reaction and the amount of allylic alcohol in the second step reaction are adjusted to provide a polymeric binder containing about 0.7 alpha-beta olefinic unsaturation units per 1,000 units molecular weight and the vinyl monomers of the binder solution are an equimolar mixture of styrene and methyl methacrylate.

EXAMPLE 11

The procedure of Example 7 is repeated with the differences that the constituent monomers of the first step reaction and the amount of allylic alcohol in the second step reaction are adjusted to provide a polymeric binder containing about 4.5 alpha-beta olefinic unsaturation units per 1,000 units molecular weight and the vinyl monomers of the binder solution are an equimolar mixture of styrene and methyl methacrylate.

EXAMPLE 12

The procedure of Example 7 is repeated with the differences that the constituent monomers of the first step reaction and the amount of allylic alcohol in the second step reaction are adjusted to provide a polymeric binder containing about 1 alpha-beta olefinic unsaturation units per 1,000 units molecular weight and the vinyl monomers of the binder solution are an equimolar mixture of styrene and methyl methacrylate.

EXAMPLE 13

The procedure of Example 7 is repeated with the differences that the constituent monomers of the first step reaction and the amount of allylic alcohol in the second step reaction are adjusted to provide a polymeric binder containing about 3 alpha-beta olefinic unsaturation units per 1,000 units molecular weight and the vinyl monomers of the binder solution are an equimolar mixture of styrene and methyl methacrylate.

EXAMPLE 14

The procedure of Example 1 is repeated with the following changes:

(a) The reactants of the first step reaction are:

| | Parts by weight |
|---|---|
| Ethyl acrylate | 38.8 |
| Methyl methacrylate | 23.2 |
| 1-butene glycidyl ether | 37.0 |
| Benzoyl peroxide | 1.0 |

(b) The reactants of the second step reaction are:

| | Parts by weight |
|---|---|
| Copolymer from (a) | 69.4 |
| Allyl alcohol | 30.4 |
| Potassium hydroxide | 0.2 |

(c) Composition of film-forming solution

| | Parts by weight |
|---|---|
| Polymer from (a) | 67.2 |
| Methyl methacrylate | 32.4 |
| Hydroquinone | 0.07 |

The term "copolymer" as used herein means a polymer of two or more vinyl monomers and an unsaturated glycidyl ether.

The abbreviation "mrad" as employed herein means 1,000,000 rad. The term "rad" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ inch in diameter at this point, is then scanned to produce a fan-shaped beam and then passed through a metal window, e.g. a magnes- ium-thorium alloy, aluminum, an alloy of aluminum and a minor amount of copper, etc., of about 0.003 inch thickness.

The film-forming material should have a viscosity low enough to permit rapid application to the substrate in substantially even depth and high enough so that a 1 mil (.001 inch) film will hold upon a vertical surface without sagging. The viscosity of the binder can be adjusted by varying the relative concentrations of the resin component and/or by varying the relative concentrations of dissimilar monomers within the monomer component. The binder is preferably applied to the substrate essentially free of nonpolymerizable organic solvents and/or diluents.

The number of alpha-beta olefinic unsaturation units in the binder resin per 1,000 units molecular weight is most accurately determined by actual measurement by conventional testing after a sample of the resin has been prepared.

It will be understood by those skilled in the art that modifications can be made within the foregoing examples within the scope of the invention as hereinbefore described and hereinafter claimed.

What is claimed is:

1. An article of manufacture comprising a substrate and an adherent coating of paint on an external surface thereof, said coating of paint on a pigment and particulate filler-free basis comprising the in situ formed polymerization product of a film-forming dispersion consisting essentially of (a) about 15 to about 75 weight percent vinyl monomers consisting essentially of vinyl monomers selected from the group consisting of alkyl esters of acrylic or methacrylic acid and vinyl hydrocarbon monomers and (b) about 85 to about 25 weight percent of a vinyl monomer-comprising binder polymer having side chain, alpha-beta, olefinic unsaturation each unit of which is separated from the principal carbon-to-carbon chain by two ether linkages, said binder polymer being formed by reacting a $C_3$ to $C_{14}$ allylic alcohol with a polymer consisting essentially of the polymerization product of a $C_6$ to $C_{17}$ unsaturated glycidyl ether with at least two different vinyl monomers selected from the group consisting of alkyl esters of acrylic or methacrylic acid and vinyl hydrocarbon monomers, said binder polymer being further characterized in that the alpha-beta olefinic unsaturation therein is limited to a concentration in the range of about 0.5 o about 5 units per 1,000 units molecular weight, crosslinked on said surface by ionizing radiation.

2. An article of manufacture comprising a substrate and an adherent coating of paint on an external surface thereof, said coating of paint on a pigment and particulate filler-free basis comprising the in situ formed polymerization product of a film-forming dispersion consisting essentially of (a) about 15 to about 75 weight percent vinyl monomers consisting essentially of vinyl monomers selected from the group consisting of esters of acrylic or methacrylic acid and a $C_1$–$C_8$ monohydric alcohol and $C_8$–$C_9$ monovinyl hydrocarbons and (b) about 85 to about 25 weight percent of a vinyl monomer-comprising binder polymer having side chain, alpha-beta, olefinic unsaturation each unit of which is separated from the principal carbon-to-carbon chain by two ether linkages, said binder polymer being formed by reacting a $C_3$ to $C_{14}$ allylic alcohol with a polymer consisting essentially of the polymerization product of a $C_6$ to $C_{17}$ unsaturated glycidyl ether with at least two different vinyl monomers selected from the group consisting of esters of acrylic or methacrylic acid and a $C_1$–$C_8$ monohydric alcohol and $C_8$–$C_9$ monovinyl hydrocarbons, said binder polymer being further characterized in that the alpha-beta olefinic unsaturation therein is limited to a concentration in the range of about 0.5 to about 5 units per 1,000 units molecular weight, crosslinked on said surface by ionizing radiation.

3. An article of manufacture in accordance with claim 2 wherein said allylic alcohol is a $C_3$ to $C_{10}$ allylic alcohol.

4. An article of manufacture in accordance with claim 2 wherein said unsaturated glycidyl ether is a $C_6$–$C_{13}$ allylic glycidyl ether.

5. An article of manufacture in accordance with claim 2 wherein said alpha-beta olefinic unsaturation in said binder polymer is limited to a concentration in the range of about 0.5 to about 3.5 units per 1,000 units molecular weight.

6. An article of manufacture in accordance with claim 2 wherein said alpha-beta olefinic unsaturation in said binder polymer is limited to a concentration in the range of about 1 to about 3 units per 1,000 units molecular weight.

7. An article of manufacture in accordance with claim 2 wherein the vinyl monomers in said film-forming dispersion are a mixture of vinyl hydrocarbon monomers and an alkyl ester of acrylic or methacrylic acid.

8. An article of manufacture in accordance with claim 2 wherein said film-forming dispersion on a pigment and particulate filler-free basis consists essentially of about 20 to about 60 weight percent vinyl monomers and about 80 to about 40 weight percent of said binder polymer.

9. A radiation-curable paint which on a pigment and particulate filler-free basis consists essentially of a film-forming dispersion consisting essentially of (a) about 15 to about 75 weight percent vinyl monomers consisting essentially of vinyl monomers selected from the group consisting of alkyl esters of acrylic or methacrylic acid and vinyl hydrocarbon monomers and (b) about 85 to about 25 weight percent of a vinyl monomer-comprising binder polymer having side chain, alpha-beta, olefinic unsaturation each unit of which is separated from the principal carbon-to-carbon chain by two ether linkages, said binder polymer being formed by reacting a $C_3$ to $C_{14}$ allylic alcohol with a polymer consisting essentially of the polymerization product of a $C_6$ to $C_{17}$ unsaturated glycidyl ether with at least two different vinyl monomers selected from the group consisting of alkyl esters of acrylic or methacrylic acid and vinyl hydrocarbon monomers, said binder polymer being further characterized in that the alpha-beta olefinic unsaturation therein is limited to a concentration in the range of about 0.5 to about 3.5 units per 1,000 units molecular weight.

10. A radiation-curable paint which on a pigment and particulate filler-free basis consists essentially of a film-forming dispersion consisting essentially of (a) about 15 to about 75 weight percent vinyl monomers consisting essentially of vinyl monomers selected from the group consisting of esters of acrylic or methacrylic acid and a $C_1$–$C_8$ monohydric alcohol and $C_8$–$C_9$ monovinyl hydrocarbons, and (b) about 85 to about 25 weight percent of a vinyl monomer-comprising binder polymer having side chain, alpha-beta, olefinic unsaturation each unit of which is separated from the principal carbon-to-carbon chain by two ether linkages, said binder polymer being formed by reacting a $C_3$ to $C_{14}$ allylic alcohol with a polymer consisting essentially of the polymerization product of a $C_6$ to $C_{17}$ unsaturated glycidyl ether with at least two different vinyl monomers selected from the group consisting of esters of acrylic or methacrylic acid and a $C_1$–$C_8$ monohydric alcohol and $C_8$–$C_9$ monovinyl hydrocarbons, said binder polymer being further characterized in that the alpha-beta olefinic unsaturation therein is limited to a concentration in the range of about 0.5 to about 3.5 units per 1,000 units molecular weight.

11. A radiation-curable paint in accordance with claim 10 wherein said allylic alcohol is a $C_3$ to $C_{10}$ alylic alcohol.

12. A radiation-curable paint in accordance with claim 10 wherein said unsaturated glycidyl ether is a $C_6$–$C_{13}$ allylic glycidyl ether.

13. A radiation-curable paint in accordance with claim 10 wherein said alpha-beta olefinic unsaturation in said binder polymer is limited to a concentration in the range of about 1 to about 3 units per 1,000 units molecular weight.

14. A radiation-curable paint in accordance with claim 10 wherein the vinyl monomers in said film-forming dispersion are a mixture of vinyl hydrocarbon monomers and an alkyl ester of acrylic or methacrylic acid.

15. A radiation-curable paint in accordance with claim 10 wherein said film-forming dispersion on a pigment and particulate filler-free basis consists essentially of about 20 to about 60 weight percent vinyl monomers and about 80 to about 40 weight percent of said binder polymer.

References Cited
UNITED STATES PATENTS

| | | | |
|---|---|---|---|
| 3,317,635 | 5/1967 | Osmond | 260—836 |
| 3,397,166 | 8/1968 | Schmidle | 260—885 |
| 3,390,206 | 6/1968 | Thompson | 260—885 |
| 3,514,500 | 5/1970 | Osmond | 260—885 |

PAUL LIEBERMAN, Primary Examiner

U.S. Cl. X.R.

260—80.72, 881, 884, 885, 886; 117—93.31; 204—159.15